Figure 1:
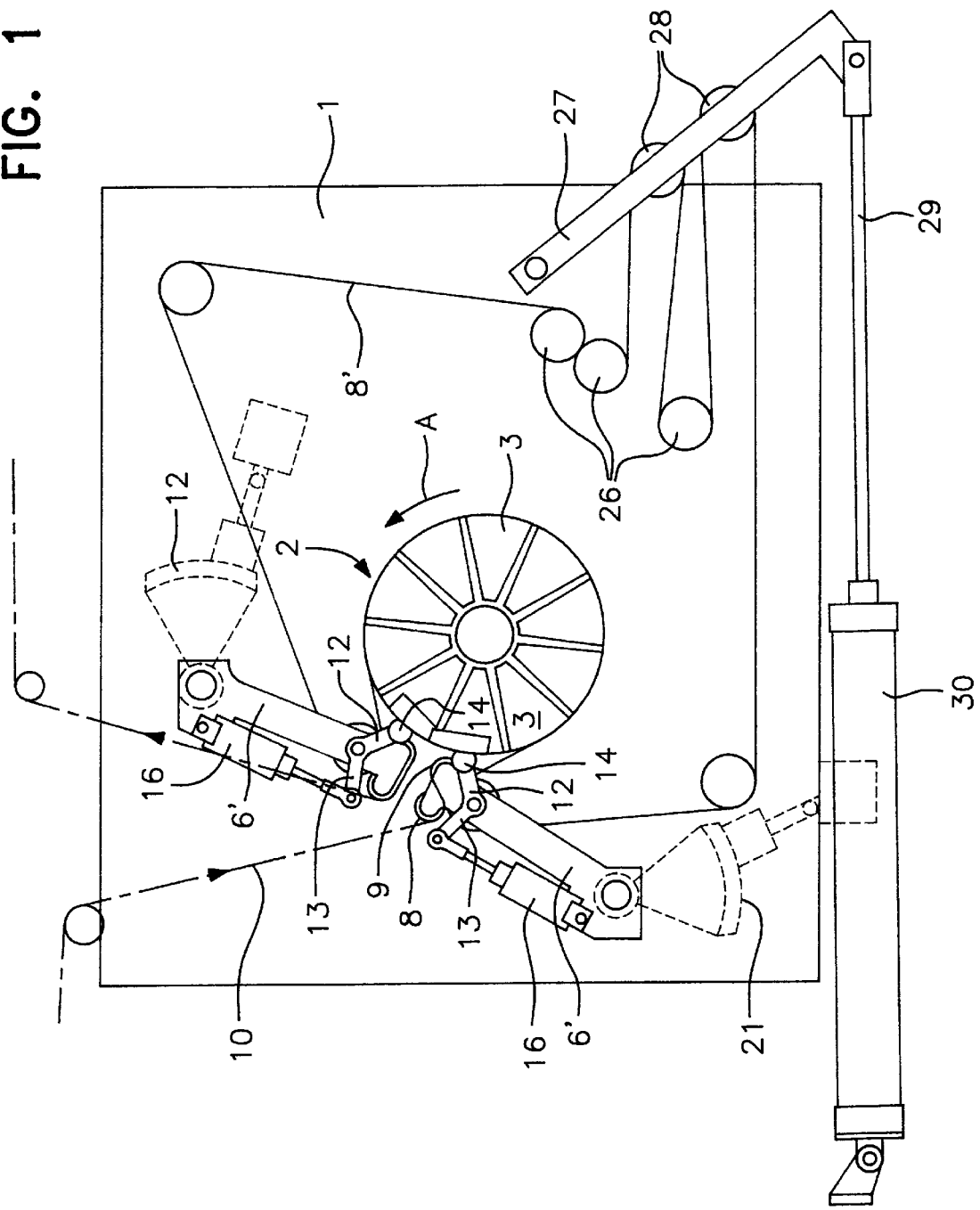

United States Patent

Eckelt

[11] Patent Number: 6,145,564
[45] Date of Patent: Nov. 14, 2000

[54] WELDING CYLINDER

[75] Inventor: Ulrich Eckelt, Tecklenberg, Germany

[73] Assignee: Windmöller & Hölscher, Lengerich, Germany

[21] Appl. No.: 09/244,979

[22] Filed: Feb. 4, 1999

[30] Foreign Application Priority Data

Feb. 9, 1998 [DE] Germany .......................... 198 05 124

[51] Int. Cl.[7] .................................................. B30B 5/04
[52] U.S. Cl. .................... 156/555; 156/582; 156/583.5
[58] Field of Search .................................... 156/555, 580, 156/582, 583.1, 583.5; 100/328, 331

[56] References Cited

U.S. PATENT DOCUMENTS

| 3,844,091 | 10/1974 | Vedvik et al. | 156/583.1 |
| 3,855,025 | 12/1974 | Bosse | 156/582 |
| 3,996,093 | 12/1976 | Winnemoller | 156/358 |
| 4,642,084 | 2/1987 | Gietman, Jr. | 493/190 |

FOREIGN PATENT DOCUMENTS 2 162 789  3/1974  Germany .

Primary Examiner—James Sells
Attorney, Agent, or Firm—Jacobson, Price, Holman & Stern, PLLC

[57] ABSTRACT

A welding cylinder, which is mounted in a frame, is provided with welding bars, which can be adjusted continuously in the radial direction, run parallel to the axis of rotation, and are distributed at uniform angular intervals over the circumference. One part of the welding cylinder's circumference is enveloped by a continuous pressure belt, whose loose side travels over guide rolls and rollers of a web storage. Between the guide rollers, bordering the pressure strand of the pressure belt, the web, to be provided with cross welds, runs up onto the welding cylinder and down from it. To adjust in a simple manner the guide rolls of the pressure belt to the different diameters of the welding cylinder, two swivelling and locking levers, whose free ends bear the guide rollers, over which the pressure belt runs up onto the welding cylinder and down from it, are mounted in the machine frame.

10 Claims, 3 Drawing Sheets

WELDING CYLINDER

The invention relates to a welding cylinder, mounted in a frame and comprising a rotary drive and welding strips, which can be adjusted continuously in the radial direction, run parallel to the axis of rotation, and are distributed at uniform angular intervals over the circumference; and comprising a pressure strand of a continuous pressure belt, which is looped around one part of its circumference, while the loose side of the belt travels over guide rolls and the rollers of a web storage; and wherein between the guide rollers, bordering the pressure strand, the web, to be provided with cross welds, runs up on the welding cylinder and down from it.

In the welding cylinder of this type, disclosed in the DE-PS 21 62 789, the guide rollers of the continuous pressure belt, bordering the inlet and outlet slit for the web, to be provided with the cross welds, are mounted rigidly in the side members of the machine frame, so that the pressure strand of the continuous pressure belt and consequently also the web, to be provided with welds, loop around only smaller circumferential angles of the welding cylinder, whose diameter tapers off. An adaptation of the guide rollers to the varying diameters of the welding cylinder would be associated in the case of the prior art welding cylinder with time-consuming retrofitting work.

Therefore, the object of the invention is to provide a welding cylinder of the type described in the introductory part, wherein the guide rolls can be easily adjusted to the different diameters of the welding cylinder.

The invention solves this problem in that two pairs of swivelling and locking levers, whose free ends bear the guide rollers, over which the pressure belt runs up onto the welding cylinder and down from it, are mounted in the frame.

In the case of the welding cylinder, according to the invention, the levers can be detached in a simple manner and swivelled into their position, adapted to the respective diameter of the welding cylinder, and locked in this position.

Expediently additional guide rolls for the web, to be provided with the welds, are mounted on the levers. These guide rolls or guide rollers can be mounted closer to the free ends of the levers than the guide rolls or the guide rollers for the pressure belt.

Expediently the levers have two guide rolls for the web, to be welded; the web can form an S-shaped loop around the inlet-sided pairs of rolls or rollers.

A preferred embodiment provides that a swivellable and locking supporting lever, which bears a supporting roll and which can be swivelled between a position, which braces itself against a welding strip, and an inactive position, is mounted on one lever of each pair of levers. When the welding strips are moved radially, thus when the diameter of the welding cylinder changes, this supporting lever rests against a welding strip so that the pairs of levers, bearing the guide rolls or guide rollers, are moved together with the radial adjustment of the welding strips; and after the welding strips have been adjusted and the levers locked, the guide rolls or rollers are in their correct position. In so doing, the supporting lever holds the pairs of levers, bearing the guide rolls or guide rollers, at a distance from the welding strips, said distance being large enough that precision adjustments can still be made at the welding strips, even after the welding strips and the levers, bearing the guide rolls, have been adjusted.

To pivot in the supporting levers for the adjustment process and to pivot out again prior to the operation, they are provided expediently with a pivot drive, which can constitute a pneumatic piston-cylinder unit.

Expediently the pairs of levers are driven by an elastic unit in the direction of the welding cylinder. Said elastic unit guarantees that, after unlocking, the pairs of levers are braced against welding strips by way of the supporting levers so that the levers can be automatically adjusted simultaneously with the radial adjustment of the welding strips.

Another embodiment provides that the pairs of levers are attached to shafts, which are mounted in the frame and which bear holding disk sectors, which can be blocked with respect to the frame by means of shims. By detaching and locking the holding disk sectors, the pairs of levers can be detached for the purpose of adjustment and blocked into new positions.

Expediently the shims are arranged at levers, which can be moved by pressure medium-piston-cylinder-spring-units.

An inventive improvement provides that the movable roll(s) of the web storage are adjustable by means of a pneumatic cylinder, whose gas or air pressure can be set to a harder operating position and a softer adjustment position. In this manner the pressure belt is elastically prestressed both during the operation and during the adjustment, where this elastic prestress is softer for the purpose of adjustment.

Another preferred embodiment provides that the resulting forces, which result from the continuous pressure belt and act on the pairs of levers, lie on lines that run between the swivel axes of the levers and the welding cylinder. In this manner the levers are always driven elastically in the direction of the welding cylinder, so that special spring units are superfluous.

One embodiment of the invention is explained in detail with reference to the drawing in the following.

FIG. 1 is a diagrammatic side view of the welding cylinder, mounted in a machine frame, with the welding strips telescoped to the minimum diameter of the welding cylinder.

Figure 2:
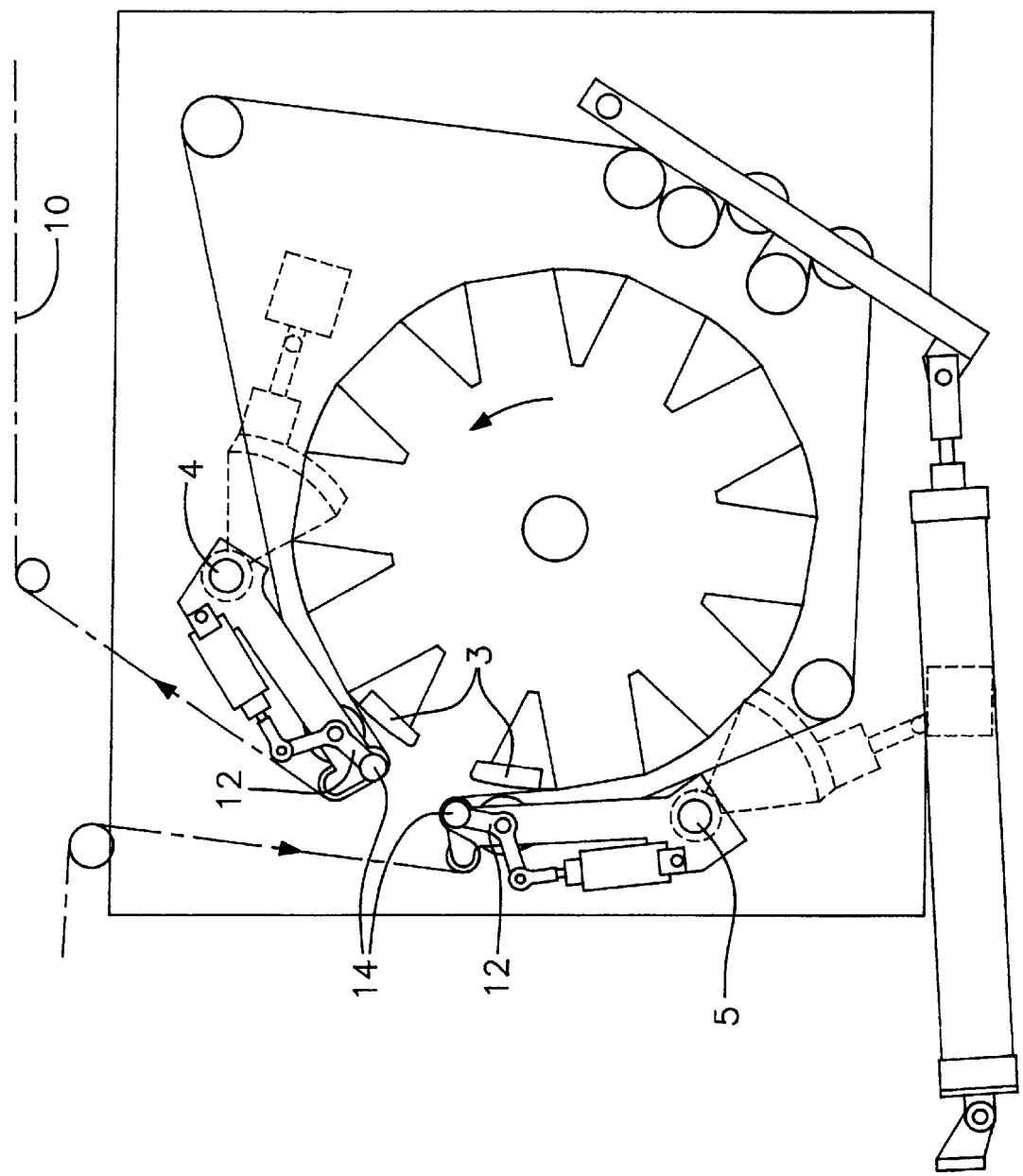
Figure 3:
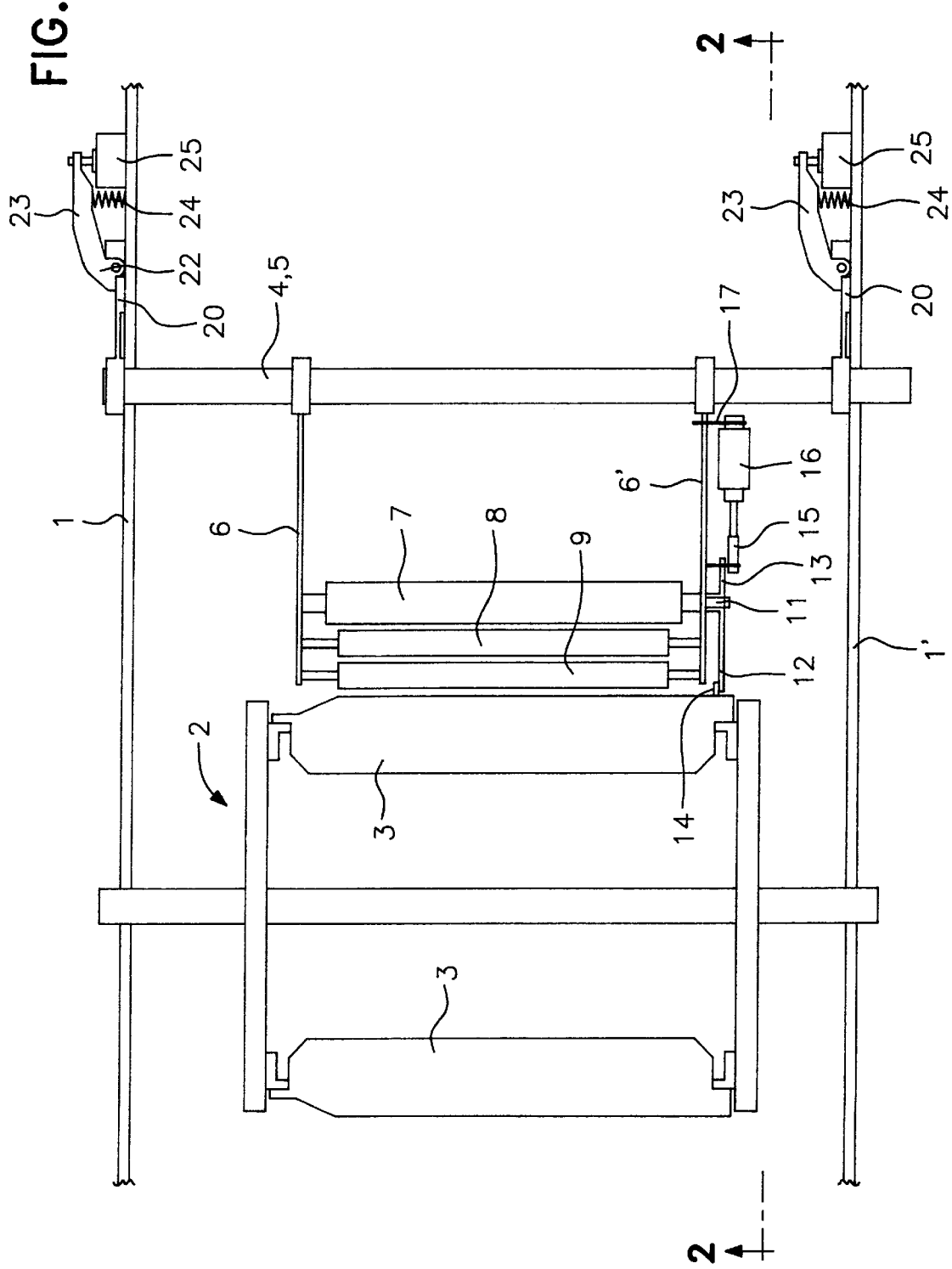

FIG. 2 is a drawing of the welding cylinder, which corresponds to that in FIG. 1 and whose welding strips are extended to the maximum diameter of the welding cylinder; and constitutes the cross sectional view along line II—II in FIG. 3; and FIG. 3 is a top view of the welding cylinder of FIG. 2, in which for the sake of comprehension the pairs of levers, bearing the guide rollers, are depicted in the exploded state.

A welding cylinder 2, which is provided with a drive and whose radially adjustable welding strips 3 are depicted schematically by means of approximately triangular segments 3, is pivot-mounted in a machine frame, of which only the side frames 1,1' are depicted schematically.

The welding cylinder, the welding strips and their adjustment drive are designed in principle analogously to those described in the DE-PS 21 62 789 so that for a detailed description reference is made to this publication.

Shafts 4, 5, whose swivelability is limited in the manner shown in FIG. 3, are mounted in the side frames 1,1'; each shaft bear a pair of levers 6,6', on whose free ends are attached so as to rotate freely a guide roller 7 for a continuous pressure belt 8 and farther toward the outside two guide rolls 8, 9 to feed in or lead away the double thermoplastic web 10, to be provided with cross welds. On the lever 6' of each lever pair 6,6' an angle lever with arms 11, 13, whose one arm 12 forms a supporting lever, on whose free end is mounted so as to rotate freely a supporting roll 14, is pivot mounted on an axle journal 11. The piston rod 15 of a pneumatic cylinder 16 is hinged to the other lever arm 3;

said pneumatic cylinder in turn is mounted on the lever 6' so as to swivel around an axle journal 17. By moving the piston rods 15 of the pneumatic cylinders 16 in and out, the supporting levers 12 can be swivelled between their inactive swung-in and active swung-out support position. The active supporting position, in which the supporting rolls 14 are braced against the welding strips 3, is evident from FIG. 1, whereas in FIG. 2 the supporting levers 12 are shown in their swung-in inactive position.

In the region of the side frames 1,1' the shafts 4, 5 are securely connected with holding disk segments 20, which form radial levers. The holding disk segments 20 are provided with circularly curved clamping areas 21, with which the shorter lever arms 22 of the clamping levers engage, whose longer lever arms 23 are swivelled into their clamping position, evident from FIG. 3, by means of compression springs 24. To loosen the blocking there are pneumatic piston-cylinder-units 25, which overcome the force of the springs 24 in order to release the holding disk segments 20.

Guide rolls 26, which are permanently attached to the frame, and guide rolls 28, which can be swivelled at a pair of levers 27, which are mounted in the machine frame, are mounted in the machine frame. The loose side of the pressure belt 8 is looped in the illustrated manner around said rolls so that they form a web storage for the pressure belt. The piston rod 29 of a pneumatic cylinder 30, which in turn is pivot mounted in the machine frame, is hinged to the free end of the pair of levers 27, bearing the swivellable guide rolls 28. The hydraulic cylinder 30 holds the web storage 26 to 28 under the requisite elastic prestress.

As evident from FIGS. 1 and 2, the continuous pressure belt 8 loops around both guide rollers 7 in such a manner that the tensile forces of both strands add to the resulting forces, whose lines of application run between the shafts 4, 5 and the welding roller 2 so that in every swivel position of the levers 6, 6' there are effective lever arms, with which the resulting forces engage that endeavor to swivel them in the direction of the welding cylinder 2.

The web forms an S-shaped loop around the guide rolls 8, 9 on the inlet side of the double web 10 and a U-shaped loop on the outlet side of said double web.

Should the welding strips 3 be shifted to a different format, the angle levers 12, 13 are swivelled, after detaching the holding disk sectors 20 by means of the pneumatic cylinders 25, into their supporting position, where the supporting rolls 14 and the supporting levers 12 are braced against the welding strips 3, as shown in FIG. 1, by means of the pneumatic cylinders 16. If now the welding strips 3 are moved in the radial direction to their changed position, they take at the same time the levers 6, 6' with them by way of the supporting rolls 14 so that the guide rollers 7 to 9 are always in their correct position with respect to the extended state of the welding strips of the welding cylinder.

During the adjustment process of the welding strips, the air pressure of the pneumatic cylinder 30 is reduced so that the pressure belt 8 is prestressed only with a lower force; and the resulting forces, produced by the strands of the pressure belt, can then to adjusted for a lower force.

What is claimed is:

1. Welding cylinder (2), mounted in a frame (1, 1') and comprising a rotary drive and welding strips (3), which can be adjusted continuously in the radial direction, run parallel to the axis of rotation, and are distributed at uniform angular intervals over the circumference, comprising a pressure strand of a continuous pressure belt (8), which is looped around one part of its circumference, while the loose side of the belt travels over guide rolls (7) and the rollers of a web storage (26, 28) and wherein between the guide rollers (7), bordering the pressure strand, the web (10), to be provided with cross welds, runs up onto said welding cylinder and down from it, characterized in that two pairs of swivelling and locking levers (6, 6'), whose free ends bear the guide rolls or guide rollers (7), over which the pressure belt (8) runs up onto the welding cylinder (2) and down from it, are mounted in the frame (1, 1').

2. Welding cylinder, as claimed in claim 1, characterized in that additional guide rolls or guide rollers (8, 9) for the web (10), to be provided with the welds, are mounted on the lever pairs (6, 6').

3. Welding cylinder, as claimed in claim 2, characterized in that the lever pairs (6, 6') bear two guide rolls (8, 9) for the web (10).

4. Welding cylinder, as claimed in claim 1, characterized in that a swivellable and lockable supporting lever (12), which bears a supporting roll (14) and which can be swivelled between a position, which braces itself against a welding strip, and an inactive position, is mounted on one lever (6') of each pair of levers (6, 6').

5. Welding cylinder, as claimed in claim 4, characterized in that the supporting lever (12) is provided with a pivot drive.

6. Welding cylinder, as claimed in claim 1, characterized in that the pairs of levers (6, 6') are driven by an elastic unit in the direction of the welding cylinder (2).

7. Welding cylinder, as claimed in claim 1, characterized in that the pairs of levers (6, 6') are attached to shafts (4, 5), which are mounted in the frame (1, 1') and which bear holding disk sectors (20), which can be blocked with respect to the frame (1, 1') by means of shims (22).

8. Welding cylinder, as claimed in claim 7, characterized in that the shims (22) are arranged at levers, which can be moved by pressure medium-piston-cylinder-spring-units (24).

9. Welding cylinder, as claimed in claim 1, characterized in that the movable roll(s) (26, 28) of the web storage are adjustable by means of a pneumatic piston-cylinder-unit (29, 30), whose gas or air pressure can be set to a harder operating position and a softer adjustment position.

10. Welding cylinder, as claimed in claim 1, characterized in that the resulting forces, which result from the continuous pressure belt (8) and act on the pairs of levers (6, 6'), lie on lines that run between the swivel axes of the levers (4, 5) and the welding cylinder (2).

* * * * *